US009965576B2

(12) United States Patent
Datta et al.

(10) Patent No.: US 9,965,576 B2
(45) Date of Patent: May 8, 2018

(54) ACCOMMODATING ENGINEERING CHANGE ORDERS IN INTEGRATED CIRCUIT DESIGN

(71) Applicant: International Business Machines Corporation, Armonk, NY (US)

(72) Inventors: Ayan Datta, Kolkata (IN); Saurabh Gupta, Meerut (IN); Jayaprakash Udhayakumar, Bangalore (IN); Rajesh Veerabhadraiah, Tumkur (IN); Alok Verma, Lakhimpur-Kheri (IN)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/656,077

(22) Filed: Jul. 21, 2017

(65) Prior Publication Data
US 2017/0323032 A1  Nov. 9, 2017

Related U.S. Application Data

(63) Continuation of application No. 15/144,969, filed on May 3, 2016.

(51) Int. Cl.
*G06F 17/00* (2006.01)
*G06F 17/50* (2006.01)

(52) U.S. Cl.
CPC ........ *G06F 17/505* (2013.01); *G06F 17/5072* (2013.01); *G06F 17/5077* (2013.01);
(Continued)

(58) Field of Classification Search
USPC ......................................................... 716/104
See application file for complete search history.

(56) References Cited

U.S. PATENT DOCUMENTS

| 5,953,236 A | 9/1999 | Hossain et al. |
| 6,446,248 B1 | 9/2002 | Solomon et al. |

(Continued)

OTHER PUBLICATIONS

"A Technology Independent Methodolgoy for Spare Latch Estimation", An IP.com Prior Art Database Technical Disclosure, Authors et. al.: Disclosed Anonymously, IP.com No. IPCOM000226870D, IP.com Electronic Publication Date: Apr. 23, 2013, 6 pages.

(Continued)

*Primary Examiner* — Mohammed Alam
(74) *Attorney, Agent, or Firm* — Steven L. Fisher-Stawinski

(57) ABSTRACT

A method includes receiving a register-transfer-level description and a gate-level description for an integrated circuit design. The gate-level description includes one or more spare latches implemented as reconfigurable latch filler cells. The method further includes receiving an engineering change order, and, responsive to the engineering change order, adding the at least one additional latch to the register-transfer-level description and, for at least one of the at least one additional latch, selecting one of the one or more spare latches in the register-transfer-level description to yield a selected spare latch. The method further includes, for the selected spare latch, identifying a selected reconfigurable latch filler cell in the gate-level description and replacing the selected reconfigurable latch filler cell with an operational latch in the gate-level description. The method further includes finalizing the integrated circuit design. A corresponding computer program product and computer systems are also disclosed.

1 Claim, 6 Drawing Sheets

(52) U.S. Cl.
CPC ...... *G06F 2217/12* (2013.01); *G06F 2217/62* (2013.01); *G06F 2217/80* (2013.01)

(56) References Cited

U.S. PATENT DOCUMENTS

| | | | |
|---|---|---|---|
| 7,774,735 B1 * | 8/2010 | Sood | G06F 17/5045 |
| | | | 716/103 |
| 7,919,981 B2 | 4/2011 | Irie | |
| 8,015,522 B2 | 9/2011 | Wang et al. | |
| 8,214,774 B2 | 7/2012 | Nardone et al. | |
| 8,302,038 B2 | 10/2012 | Chen | |
| 8,810,280 B2 | 8/2014 | Pyapali et al. | |
| 8,928,381 B1 | 1/2015 | Goh | |
| 2003/0145297 A1 * | 7/2003 | Cote | G06F 17/5022 |
| | | | 716/106 |
| 2008/0301614 A1 | 12/2008 | St. Juste et al. | |
| 2009/0172615 A1 * | 7/2009 | Ortiz | G01B 31/31853 |
| | | | 716/106 |
| 2009/0288045 A1 * | 11/2009 | Chien | G06F 17/505 |
| | | | 716/103 |
| 2010/0201400 A1 | 8/2010 | Nardone et al. | |
| 2012/0066654 A1 | 3/2012 | Hopkins et al. | |
| 2013/0191799 A1 | 7/2013 | Yasunaka | |

OTHER PUBLICATIONS

"Design Aware Gate Array Style Spare Latch Planning and Distribution", An IP.com Prior Art Database Technical Disclosure, Authors et. al.: Disclosed Anonymously, IP.com No. IPCOM000241528D, IP.com Electronic Publication Date: May 8, 2015, 7 pages.

Datta et al., "Accommodating Engineering Change Orders in Integrated Circuit Design," U.S. Appl. No. 15/144,969, filed May 3, 2016.

List of IBM Patents or Patent Applications Treated as Related, Signed Jul. 21, 2017, 2 pages.

Office Action, Aug. 31, 2017, U.S. Appl. No. 15/144,969 at pp. 11-12 (Discussion of Claim 7).

* cited by examiner

ACCOMMODATING ENGINEERING CHANGE ORDERS IN INTEGRATED CIRCUIT DESIGN

BACKGROUND

The present invention relates generally to the field of integrated circuit design, and more particularly to accommodating engineering change orders by including spare latch circuits.

Integrated circuit design is a complex and drawn-out process. From time to time, requirements to change a circuit design are made after substantial design work has been completed. These requests, termed "Engineering Change Orders" ("ECOs") introduce additional complexity into the process. Engineers anticipate ECOs by including extra combinatorial logic and spare latches, which can be reconfigured, if needed, by metal-only ECO. Metal-only ECO is common practice in Complementary Metal-Oxide Semiconductor (CMOS) designs. In metal-only ECO, only a few of the masks for the original design are altered, typically for metal layers, hence the designation metal-only. Using metal-only ECO, engineers can activate extra latches, gates, and other structures that have been placed in the design in case of an eventual ECO requirement for additional structures. Engineers continue to face challenges in anticipating and facilitating ECOs.

SUMMARY

A computer-implemented method includes identifying an in initial register-transfer-level description for an integrated circuit design and adding one or more spare latches to the initial register-transfer-level description to yield a modified register-transfer-level description for the integrated circuit design. The computer-implemented method further includes performing placement and routing for the modified register-transfer-level description to yield a gate-level description for the integrated circuit design. The one or more spare latches exist in the gate-level description. The computer-implemented method further includes converting at least one of the one or more spare latches in the gate-level description into a reconfigurable latch filler cell to yield a modified gate-level description for the integrated circuit design and finalizing the integrated circuit design. A corresponding computer program product and computer system are also disclosed.

In another aspect, a computer-implemented method includes receiving a register-transfer-level description and a gate-level description for an integrated circuit design. The gate-level description includes one or more spare latches implemented as reconfigurable latch filler cells. The computer-implemented method further includes receiving an engineering change order for the integrated circuit design. The engineering change order requires at least one additional latch. The computer-implemented method further includes, responsive to the engineering change order, adding the at least one additional latch to the register-transfer-level description and, for at least one of the at least one additional latch, selecting one of the one or more spare latches in the register-transfer-level description to yield a selected spare latch. The computer-implemented method further includes, for the selected spare latch, identifying a selected reconfigurable latch filler cell in the gate-level description and replacing the selected reconfigurable latch filler cell with an operational latch in the gate-level description. The computer-implemented method further includes finalizing the integrated circuit design. A corresponding computer program product and computer systems are also disclosed.

In another aspect, a method of producing an integrated circuit include producing an integrated circuit design, adding at least one spare latch design to the integrated circuit design, replacing at least one of the at least one spare latch design with a reconfigurable latch filler cell design, and manufacturing the integrated circuit design.

In another aspect, a microelectronic structure includes a latch circuit. The latch circuit includes one or more power connection sites and one or more clock connection sites. The microelectronic structure further includes at least one disconnection. The at least one disconnection is located on at least one of any of the one or more power connection sites and any of the one or more clock connection sites.

In another aspect, a microelectronic structure includes a latch circuit. The latch circuit includes one or more power connection sites and one or more clock connection sites. At least one of any of the one or more power connection sites and any of the one more clock connection sites including a connection made by connecting a designed disconnection using a metal-only engineering change order.

DETAILED DESCRIPTION

Figure 1:
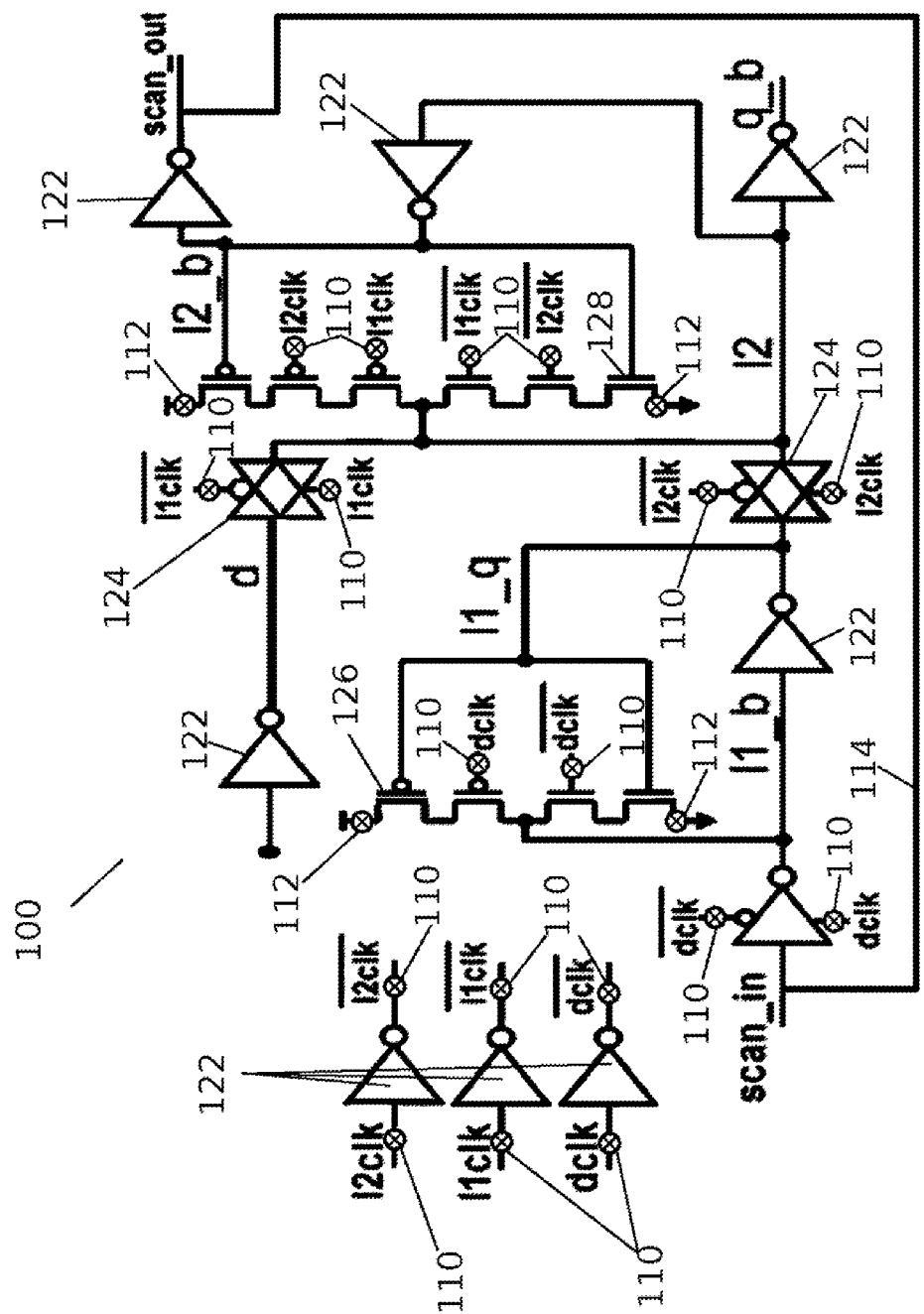
FIG. 1 is a schematic diagram for a reconfigurable latch filler cell, in accordance with at least one embodiment of the invention.

Designers of integrated circuits often include spare latch circuits (also known as flip-flops) in initial designs, in the event that more latches are needed to implement later ECOs (including metal-only ECOs). As used herein, the term "spare latch" means a latch circuit that is instantiated in a circuit design but has no logic function function other than to be connected later for the purpose of updating or correcting the logic as a result of a later ECO. Latches are inherently state-based sequential logic that generally must be driven by at least one clock to function correctly. Latches with scan capability are often found in modern integrated circuit designs, and these circuits include verification steps that require additional clock drivers. Combinatorial logic, in contrast to latches, does not depend on prior states and does not require timing as rigorous as sequential circuits. As a result, extensible extra combinatorial logic can be added to an integrated circuit design, and this extra logic can be reconfigured after manufacturing or in ECO by configuring various gates. The extra combinatorial logic need not consume significant additional power or require significant additional clock buffer size. However, extra latches do require significant power, clock, and scan connections.

Historically, designers have avoided adding latches in ECO because adding latches tends to disturb the load on the clock buffers and the length of the scan chain, which leads to design rule violations. Resolving design rule violations can be time consuming and costly. This can be addressed by retaining all connectivity related to power, clock, and scan for the spare latches. However, increasingly tight design rules and small footprint requirements have meant that reconfigurable combinatorial logic cannot be used to configure latch circuits. Current techniques include leaving all power, clock, and scan connections in place while routing the latch output back to the input, which saves on power dissipation by preventing the latch from switching internally. Current techniques provide for using such a spare latch in ECO by replacing the feedback path from output to input with new logic.

Typically, 2%-3% of the number of originally instantiated latches are added to the design as spares. The inventors have observed and/or recognized that any unused of these spare latches will contribute to overall power dissipation of the design, leakage of power from the transistors inside the latch, and loss of dynamic power from the clock buffers for the spare latches. The inventors have further observed and/or recognized that adding more spare latches would enhance the ECO-compatibility of a given design, however the aforementioned limitations keep the fraction of spare latches low. The inventors have further observed and/or recognized that, in a contemporary multi-million gate design, the number of spare latches is nontrivial and can account for noticeable increases in dynamic and leakage power losses. Thus, the inventors have observed and/or recognized that a power efficient ECO methodology for a reconfigurable latch filler cell that permits the extensible use of spare latches while not significantly affecting clock routing and scan chain routing, would be an improvement to the art. It will be understood that, as used herein, the term "reconfigurable latch filler cell" means a filler cell that is reconfigurable and that is used in a replacement location of a latch, and not, for example, a latch that is reconfigurable and is used as a filler cell. Further, it will be understood that the term "filler cell", irrespective of whether the filler cell is for a latch or is reconfigurable, means a collection of structures within an integrated circuit that are nonfunctional as-designed, but can easily converted into a functional cell at a later stage of manufacturing, for example metal-only ECO. It will be recognized, however, that the aforementioned advantages over various prior art techniques will not necessarily all be present in all embodiments of the present invention.

In accordance with the foregoing, and without requiring that any particular embodiment exhibit any particular advantage, the inventors have further observed that embodiments that exhibit some or all of the following features would be advantageous:

The area footprint of a cell according to the invention should be the same as that of an originally designed latch.

A cell according to the invention should be pin compatible with an originally designed latch.

A cell according to the invention and an originally designed latch should have the same shape in Front End of Line (FEOL) fabrication, such that the two can be different in metal-only ECO, but not prior to the metal fabrication stages.

A cell according to the invention should be disconnected internally from the power rails.

A cell according to the invention should be internally disconnected between the clock pins and the transistors.

Referring now to the invention in more detail, FIG. 1 depicts a schematic diagram for a reconfigurable latch filler cell, in accordance with at least one embodiment of the present invention. The circuit depicted in FIG. 1 is understood to be effective, in the absence of the depicted disconnections, as a latch and/or flip-flop. It will be understood however that the principles of the invention may apply to any spare sequential logic circuit that may be inserted into an integrated circuit design for use in ECO.

In the depicted embodiment, the reconfigurable latch filler cell 100 supports various pin connections. Specifically, the node marked d represents the input signal connection site, and the node marked q_b represents the output signal connection site. The node marked scan_in represents the scan input connection site, and the node marked scan_out represents the scan output connection site. The nodes marked l1_q and l2 represent internal nodes of the latch. Three clock signals are depicted at various clock connection sites (i.e., clock pins): l1clk, l2clk, and dclk. Additionally, each clock signal has a corresponding inverted clock signal: $\overline{\text{l1clk}}$, $\overline{\text{l2clk}}$, and $\overline{\text{dclk}}$. Each clock signal is shown routed via a CMOS inverter 122. These CMOS inverters 122 may be dedicated to the reconfigurable latch filler cell 100, or they may provide shared inverted clock signals to several reconfigurable latch filler cells and/or latches.

In the depicted embodiment, various clock disconnections 110 are shown at each connection between any circuit element and a clock signal or inverted clock signal. The clock disconnections 110 may be achieved by not describing the connection in the metal-only layers. Similarly, the clock disconnections 110 may be reconnected by describing such a connection in the metal-only layers such that the connection may be made in metal-only ECO.

Referring still to FIG. 1, various other component devices of the latch may include transmission gates 124, P-type metal oxide field-effect transistors (MOSFETs) 126, and N-type MOSFETs 128. Power disconnections 112 are located as source and drain power connection sites. Power disconnections 112 may be achieved and reconnected in like manner to clock disconnections 110 by selectively not describing or describing the connections in the metal-only layers of the design.

Referring still to FIG. 1, in the depicted embodiment, a short 114 is connected from the scan_in scan input connection site to the scan_out scan output connection site. The short ensures that the scan terminals of the reconfigurable latch filler cell are logically neutral, even though the clock pins that would drive the scan functionality are disconnected by clock disconnections 110.

Referring still to FIG. 1, in the depicted reconfigurable latch filler cell 100 all of the power connection sites include a power disconnection 112, and all of the clock connection sites include a clock disconnection 110. Thus, power dissipation between the scan input connection site and the scan output connection site may be prevented.

Referring still to FIG. 1, the depicted reconfigurable latch filler cell 100 may be taken as analogous to an operational or designed latch circuit. Thus, the area footprint of the reconfigurable latch filler cell 100 may be understood to be no larger than that of an operational latch or a designed latch. In various embodiments, an operationally designed latch may be understood as a latch that is operational by design without having been designated as spare, converted into a latch filler cell, or converted from a latch filler cell to an operational latch.

Thus, another aspect of the invention may include a latch circuit that has been made operational from a reconfigurable latch filler cell, such as the reconfigurable latch filler cell 100, by an engineering change order. More particularly, in such an aspect, at least one of any of the one or more power connection sites and any of the one more clock connection sites include a connection made by connecting a designed disconnection, such as clock disconnection 110 or a power disconnection 112, using a metal-only engineering change order. Similarly, the scan function in such an aspect may be understood such that the latch circuit has been made by removing a short, such as the short 114, from the scan input site to the scan output site using a metal-only engineering change order.

Figure 2:
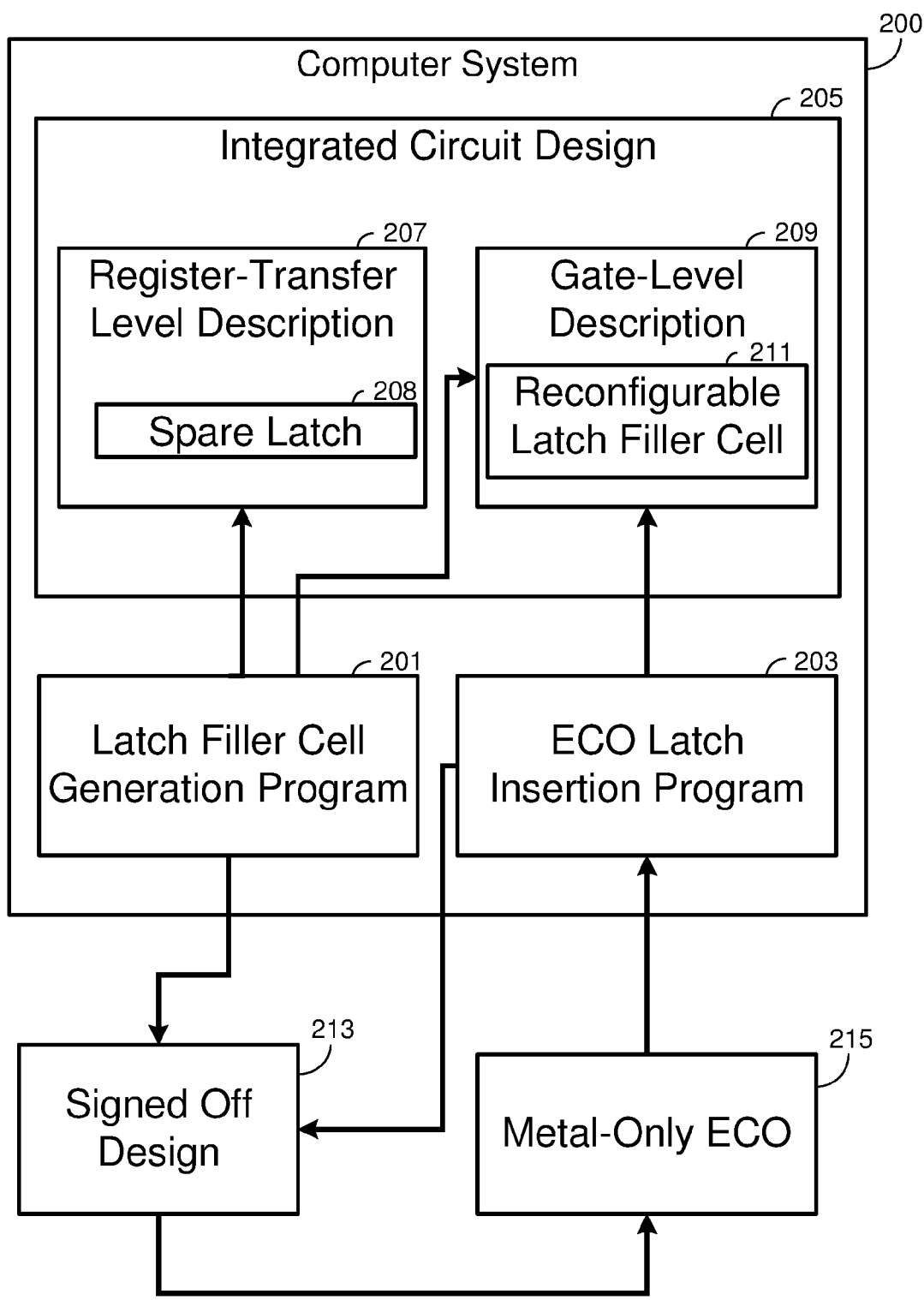
FIG. 2 is a block diagram depicting an operational environment for various computer programs, in accordance with at least one embodiment of the invention.

Referring now to FIG. 2, FIG. 2 is a block diagram depicting an operational environment for various computer programs. A computer system 200, for example, along the lines depicted in FIG. 6, stores and/or operates on an integrated circuit design 205. The integrated circuit design 205 may be represented electronically using one or more Hardware Description Languages (HDLs) at various levels of abstraction. In the depicted embodiment, the several levels of abstraction include a Register-Transfer Level (RTL) description 207 and a gate-level description 209. Known and/or existing modules may be employed by the computer system 200 to perform synthesis of logic gates and other circuit elements, followed by placement of the synthesized logic elements within a generally defined area, and then followed by routing of wires between the logic gates and other elements. The synthesis, placement, and routing steps may be performed from the RTL 207 to yield the gate-level description 209. The gate-level description 209 may be represented as a "golden placed view", which reflects both the gate-level description 209 is "placed"—it includes the location and wiring for all elements—and "golden"—it is subject to various design restrictions that prohibit any modification, except by specially authorized workflow practices, such as ECO.

Referring still to the embodiment depicted in FIG. 2, the RTL 207 is shown to include at least one spare latch 208, and the gate level description is shown to include at least one reconfigurable latch filler cell 211. According to the depicted embodiment, a latch filler cell generation program 201 may be understood as operating on the RTL 207 and the gate-level description 209 as part of and/or performing initial synthesis, placement, and routing for the integrated circuit design 205 in conjunction with adding reconfigurable latch filler cells, in accordance with the present invention. In the depicted embodiment, operation of the latch filler cell generation program 201 results in a signed off design 213—that is, the golden placed view is set, and the development of the integrated circuit design 205 with further modification restricted. In addition, an ECO latch insertion program 203 may be understood as operating upon the gate-level description 209 as part of and/or performing the design modification functions of an ECO, such as the metal-only ECO 215, in conjunction with converting reconfigurable latch filler cells 211 to operational latches, in accordance with the present invention.

Figure 3:
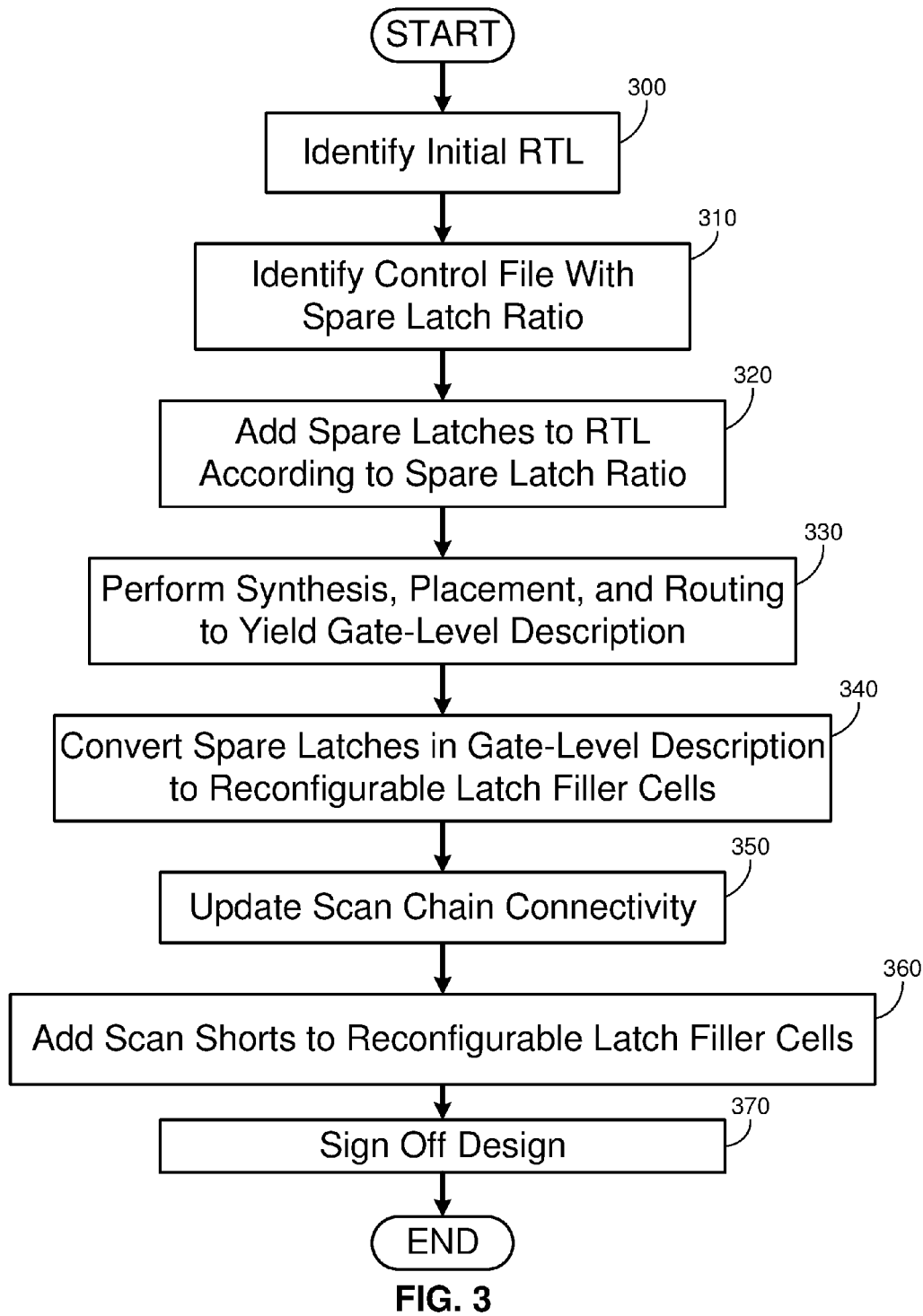
FIG. 3 is a flowchart diagram depicting operational steps for a latch filler cell generation program, in accordance with at least one embodiment of the invention.

Referring now to FIG. 3, FIG. 3 is a flowchart diagram for a latch filler cell generation program 201, in accordance with at least one embodiment of the invention. At step 300, the latch filler cell generation program 201 identifies an initial RTL, such as the RTL 207. The initial RTL is for an integrated circuit design, such as the integrated circuit design 205. The initial RTL may be understood as any integrated circuit design as may be under development by a person or entity practicing the invention, for example a team of engineers at an integrated circuit design firm may be designing a new chip for a customer. The initial RTL may be expressed in a high level hardware description language, in accordance with the concept of register-transfer as including large functional components, such as adders, shifters, pipelines, registers, etc. In the depicted embodiment, the initial RTL is identified without any spare latches instantiated, but would generally include at least one operationally designed latch.

Referring still to the embodiment depicted in FIG. 3, at step 310, the latch filler cell generation program 201 reads from a control file associated with the initial RTL. Through the control file, or, in alternative embodiments, as a parameter specified in the initial RTL, designers may specify a spare latch ratio. The spare latch ratio designates how many spare latches should be added for the integrated circuit design as a whole or, more granularly, for each clock domain in the integrated circuit design. More particularly, the spare latch ratio may be a predetermined ratio for a quantity of spare latches to a number of operational latches. Based on the spare latch ratio and the number of latches in the design or a given part of the design, such as a clock domain, the latch filler cell generation program 201 may calculate the quantity of spare latches needed by multiplying the number of operationally designed latches by the spare latch ratio to yield the desired number of spare latches. Possible realistic values for the spare latch ratio may fall in the range of 2%-4%. Practitioners of the invention may base a more refined determination of the optimal spare latch ratio by considering historical data on latches used and latches needed in ECO, design-specific or test-floor specific estimations, and verification coverage analyses. Notably, some embodiments of the invention may permit a larger spare latch ratio, for example 5% or larger, than previously practiced; this enhances the ECO-ability of the design with the downside, power and clock dissipation, alleviated by practice of the invention.

Referring still to the embodiment of FIG. 3, at Step 320 the latch filler cell generation program 201 adds spare latches according to the spare latch ratio. Specifically, in the depicted embodiment, the latch filler cell generation program 201 inserts spare latches (e.g., spare latch 208), in the quantity determined based on the spare latch ratio, into the initial RTL to yield a modified RTL for the integrated circuit design. A post-process may be employed to instantiate actual latches for all spares added.

In the depicted embodiment, at step 330, the latch filler cell generation program 201 performs synthesis, placement, and routing on the integrated circuit design to yield a gate-level description, such as the gate-level description 209. The gate-level description initially includes latch standard cells for all of the instantiated spare latches. At step 340, the latch filler cell generation program 201 converts the spare latches in the gate-level description into reconfigurable latch filler cells, such as the reconfigurable latch filler cell 211, to yield a modified gate-level description for the integrated circuit design. Replacing the spare latches with reconfigurable latch filler cells may be achieved by a post process, which may be understood as a subroutine of the latch filler cell generation program 201. Each reconfigurable latch filler cell may be modeled on the reconfigurable latch filler cell 100. In various embodiments, the reconfigurable latch filler cells have an area footprint that is identical to or no larger than that of an operational latch; this ensures that the reconfigurable latch filler cell will not cause any placement overlaps in the gate-level description. In the depicted embodiment, the reconfigurable latch filler cell includes at least one disconnection from a power rail, such as the power disconnections 112. Similarly, the reconfigurable latch filler cell may include at least one disconnection from a clock pin, such as the clock disconnections 110. Thus, the cell may be considered pin-compatible with the various clock signals (in FIG. 1 l1clk, l2clk, and dclk). The latch filler cell generation program 201 may achieve disconnections in the gate-level description by inserting an interruption or break in the wiring, as shown in FIG. 1. Similar disconnections may be applied to the data pins (e.g., d and q_b in FIG. 1), which remain pin-compatible with surrounding logic and routes so that new routing is not required to convert the reconfigurable latch filler cell into a latch. Thus, the layout of the circuit elements and wiring remains in place, and any unused wire can be activated by fixing the disconnection in metal-only ECO.

Referring still to the embodiment depicted in FIG. 3, at step 350, the latch filler cell generation program 201 updates scan chain connectivity for the integrated circuit design. In various embodiments, the contemplated latches include scan capability and support an implementation of a scan chain in the integrated circuit design. The scan chain is a testing methodology for integrated circuits wherein latches are paired such that scan data may be propagated through a configuration of latches for testing at various internal nodes of the integrated circuit. In the depicted embodiment, both operational latches and reconfigurable latch filler cells may have scan input connection and scan output connection (e.g., scan_in and scan_out in FIG. 1). Before applying a short (e.g., the short 114) from the scan input connection to the scan output connection, the latch filler cell generation program 201 may rename or re-identify the nets connected to the scan input and scan output to the operational latch as singe net in the scan chain representation, ensuring that the scan chain logic does not break. Alternatively, the reconfigurable latch filler cell may be understood as not having a scan in pin or a scan out pin, while preserving the routes to these pins. Still within step 350 in the depicted embodiment, the latch filler cell generation program 201 may lock the routes to the scan input and scan output connections so that subsequent routines cannot change them; this effectively creates an open on the scan net and leaves the reconfigurable latch filler cell as logically neutral with respect to the scan net.

Referring still to the embodiment of FIG. 3, at step 360, the latch filler cell generation program 201 adds scan shorts, such as the short 114, to the reconfigurable latch filler cells in the gate-level description. More particularly, the latch filler cell generation program 201 causes various otherwise-standard post-route optimizations to be applied to the gate-level description. These optimizations include routing the scan opens, which may be understood as including adding the short from scan input to scan output. By having locked the route segments previously, the latch filler cell generation program 201 forces the scan chain subroutines to find a small open segment without allowing a complete rip and reroute.

In some embodiments, the poste-route optimizations may take account of the size of the clock buffers for the integrated circuit design. In particular, the latch filler cell generation program 201 may anticipate that disconnecting the reconfigurable latch filler cells from their clock pins will decrease the load on the clock buffers. Clock buffers may be understood as amplifier circuits that are effective to ensure satisfactory clock signal strength throughout the integrated circuit. Various otherwise-standard optimization routines may determine that the clock buffer load is reduced and accordingly downsize size and/or reduce the capacity of the clock buffers as an optimization. The latch filler cell generation program 201 may prevent his by locking the size of the clock buffers in the gate-level description. To achieve the prevention, the latch filler cell generation program 201 may identify one or more clock buffers for the integrated circuit design, determine an optimal clock buffer size for the one or more clock buffers, based on the quantity of spare latches used, and prevent one or more optimization routines from reducing the one or more clock buffers below the optimal clock buffer size. Accordingly, designers may maintain the clock buffer size restriction through until logic is frozen for the integrated circuit design, immediately prior to manufacture: that is, when the possibility of an ECO is closed.

Referring still to the embodiment of FIG. 3, at step 370, the latch filler cell generation program 201 signs off and/or finalizes the integrated circuit design. By signing off the design, the design is taken to be ready for testing, ECO, and eventual fabrication. Finalizing the design can include any business process that results in the design being advanced for testing and/or manufacturing.

Figure 4:
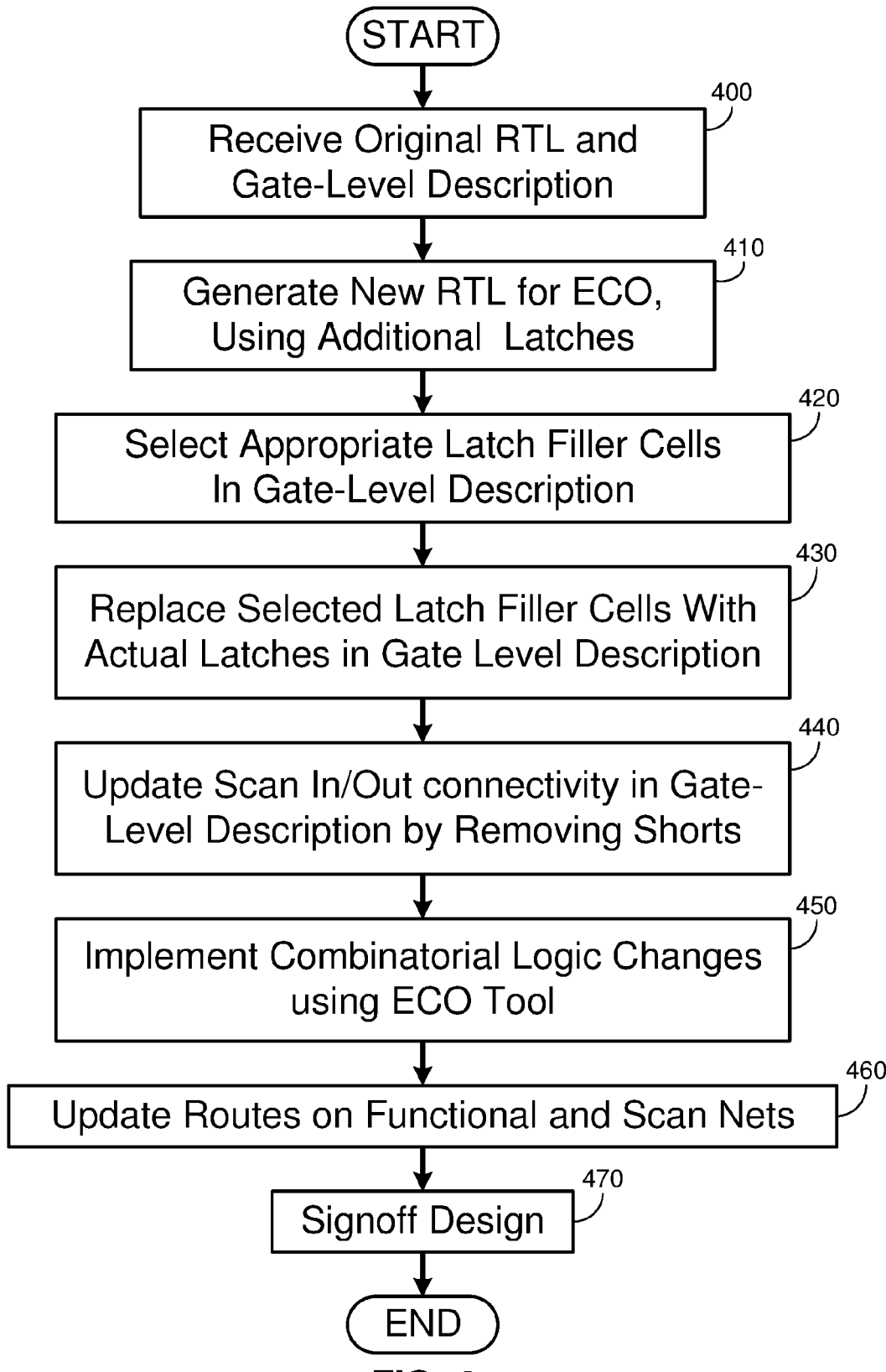
FIG. 4 is a flowchart diagram depicting operational steps for an ECO latch insertion program, in accordance with at least one embodiment of the invention.

Referring now to FIG. 4, FIG. 4 is a flowchart diagram depicting various operational steps for an ECO latch insertion program 203, in accordance with at least one embodiment of the invention. At step 400, the ECO latch insertion program 203 receives an original RTL and a gate-level description for an integrated circuit design. The integrated circuit design may be received from a physical or virtual data store associated with the original production of the design, from an archival data store, or other source. In the depicted embodiment, the gate-level description includes one or more spare latches implemented as latch filler cells. Correspondingly, the original RTL may include one more spare latches at the appropriate level of abstraction. In the depicted embodiment, at step 410, the ECO latch insertion program 203 receives an ECO for the integrated circuit design; the ECO requires at least one additional latch. As used herein, an "additional latch" means an operational latch that is added as a result of the ECO, and not a filler cell or any other structure other than a latch. Continuing in Step 410, the ECO latch insertion program 203 generates new RTL for the ECO by adding at least one additional latch to the original RTL.

Referring still to the embodiment of FIG. 4, at step 420, the ECO latch insertion program 203 selects appropriate latch filler cell in the gate-level description. On a latch-by-latch basis, the ECO latch insertion program 203 may be understood as, for at least one of the at least one additional latch, selecting one of the one or more spare latches in the register-transfer-level description to yield a selected spare latch. The ECO latch insertion program 203 may make the selection based on proximity, routing optimization, or other techniques incorporating any applicable engineering considerations that the designers may have in mind for the integrated circuit design and/or the ECO.

Referring still to the embodiment of FIG. 4, at step 430 the ECO latch insertion program 203 replaces the selected latch filler cells with actual latches in the gate-level description and/or a golden placed view. For the selected spare latch, the ECO latch insertion program 203 identifies a selected reconfigurable latch filler cell in the gate-level description and replaces the selected reconfigurable latch filler cell with an operational latch in the gate-level description and/or golden placed view. In some embodiments, such as the cell depicted in FIG. 1, the reconfigurable latch filler cell (e.g., the reconfigurable latch filler cell 100) includes at least one disconnection from a power rail (e.g., a power disconnection 112). In such embodiments, replacing the selected reconfigurable latch filler cell with an operational latch in the gate-level description and/or golden placed view includes connecting the reconfigurable latch filler cell to the power rail, for example by overwriting the power disconnection (e.g., the power disconnection 112) with a wire route. In some embodiments, such as the cell depicted in FIG. 1, the reconfigurable latch filler cell (e.g., the reconfigurable latch filler cell 100) includes at least one disconnection from a clock pin (e.g., a clock disconnection 110). In such embodiments, replacing the selected reconfigurable latch filler cell with an operational latch in the gate-level description and/or golden placed view includes connecting the reconfigurable latch filler cell to the clock pin, for example by overwriting the clock disconnection (e.g., the clock disconnection 110) with a wire route.

Referring still to the embodiment of FIG. 4, at step 440, the ECO latch insertion program 203 updates scan input and output connectivity in the gate-level description by removing shorts, such as the short 114. In the depicted embodiment, the reconfigurable latch filler cell includes a scan input connection (e.g., scan_in in FIG. 1) connected to a scan output connection (e.g., scan_out in FIG. 1) by a short (e.g., the short 114). In the depicted embodiment, replacing the selected reconfigurable latch filler cell with an operational latch in the gate-level description and/or golden placed view includes removing the short. More specifically, the ECO latch insertion program 203 identifies scan routes that have been altered by converting reconfigurable latch filler cells to latches and adjusting those scan routes. Where the scan routes have been prepared as described above, only short gaps in the routes will be left open and these can be filled in without significant rerouting, appropriate to metal-only ECO.

Referring still to the embodiment of FIG. 4, at step 450, the ECO latch insertion program 203 implements combinatorial logic changes using an ECO tool. In contemporary chip design ECO procedures, an "ECO tool" may be understood as a software utility or subroutine that adds metal-only gates and other combinatorial logic to achieve the design requirements of the ECO, and which runs as a function of, or in conjunction with, the ECO latch insertion program 203. In the depicted embodiment, the ECO latch insertion program 203 implements the combinatorial logic changes by generating a netlist from the gate-level description, routing the ECO based on the netlist, and omitting re-ordering the scan chain for the integrated circuit design. Equivalently, the ECO latch insertion program 203 maybe understood to generate the ECO netlist form the golden placed view using one or more ECO tools, as described above. The ECO latch insertion program 203 can safely skip scan-chain re-ordering because the latches are connected to the existing scan chain as a result of the reconfigurable latch filler cell methodology. Instead, the ECO latch insertion program 203 achieves the scan reconnections by minor connectivity updates that do not require further analysis. The ECO latch insertion program 203 may proceed to make the required connections needed for all functional and scan nets at step 460.

In some embodiments, the ECO latch insertion program 203 may take account of the clock buffers. As described above, the clock buffers may be locked to prevent downsizing during optimization. At ECO, if the design logic is frozen for a particular version of the integrated circuit design, the ECO latch insertion program 203 may unlock the clock buffer sizes, thereby allowing the clock buffer size to be optimized post-ECO. Equivalently, the ECO latch insertion program 203 may identify one or more clock buffers for the integrated circuit design, wherein the one or more clock buffers have been sized for the one or more spare latches, and the ECO latch insertion program 203 may reduce the one or more clock buffers to an optimized clock buffer size, based on the number of instantiated latches in the integrated circuit design, as modified by the ECO. The downsizing may be done both at the design and parent levels.

Referring still to the embodiment of FIG. 4, at step 470, the ECO latch insertion program 203 may sign off and/or finalize the design and/or cause the rest of the sign off workflow for the design to be completed.

Figure 5:
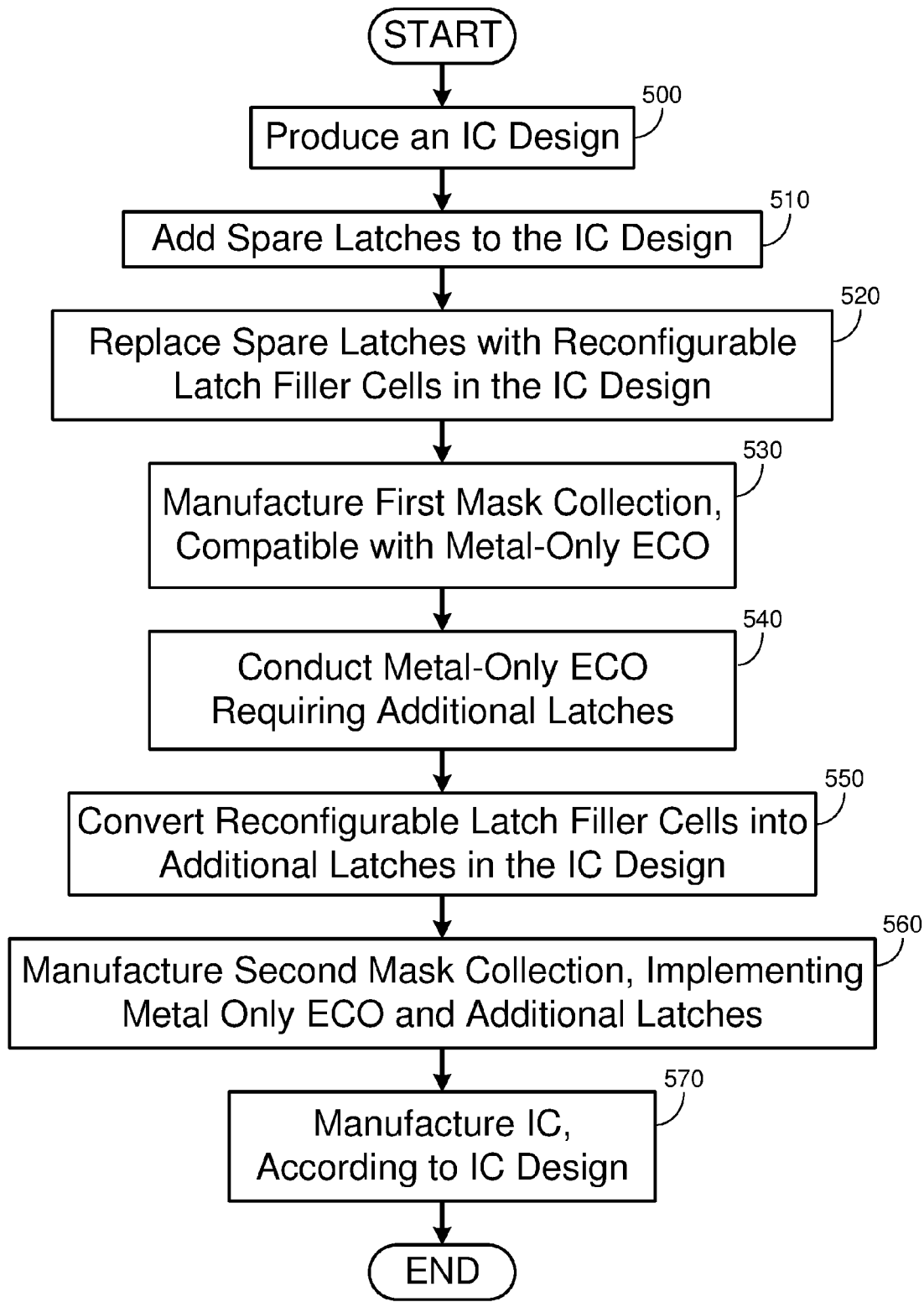
FIG. 5 is a flowchart diagram for a method of manufacturing an in accordance with at least one embodiment of the present invention.

Referring now to FIG. 5, FIG. 5 is a flow chart diagram for various steps for a method of producing an integrated circuit by an IC (integrated circuit) producing entity, such as a chip design firm, in accordance with at least one embodiment of the present invention. At step 500, the IC producing entity produces an integrated circuit design. The integrated circuit design may be an implementation of whichever features the IC producing entity wishes to promulgate. At step 510, the IC producing entity adds at least one spare latch design to the integrated circuit design, for example using a latch filler cell generation program, as described above. At step 520, the IC producing entity replaces at least one of the at least one spare latch design with a reconfigurable latch filler cell (e.g., the reconfigurable latch filler cell 100); replacement may be achieved using a spare latch insertion program, as described above.

Referring still to the embodiment of FIG. 5, at step 530, the IC producing entity manufactures or has manufactured a first collection of masks for the integrated circuit design. The masks are photomasks used in integrated circuit manufacturing, and the first collection of masks may be understood to include only those masks that are for process unaffected by metal-only ECO. Thus, the first collection of masks can be manufactured before the design is finalized. In an embodiment, the first collection of masks define at least one reconfigurable latch filler cell, akin to the reconfigurable latch filler cell 100. Mask manufacturing may be done by contracting with a specialist mask production firm, contracting with an IC manufacturing firm that produces photomasks, or using in-house facilities of the IC producing entity. Further, in the context of the present invention, the act of manufacturing photomasks can include contracting for the production of photomasks, for example by a design firm contracting with an IC manufacturer.

Referring still to the embodiment of FIG. 5, at step 540, the IC producing entity conducts a metal-only ECO for the integrated circuit design that requires additional latches. At step 550, the IC producing entity converts at least one reconfigurable latch filler cell design to an operational latch design by the metal-only ECO. The IC producing entity may operate an ECO latch insertion program, such as the ECO latch insertion program 203, in implementing step 550.

Referring still to the embodiment of FIG. 5, at step 560, the IC producing entity, responsive to the metal-only ECO, manufactures or has manufactured a second collection of masks for the integrated circuit design. The second collection of masks implements the metal-only ECO and defines converting at least one reconfigurable latch filler cell into an operational latch.

Referring still to the embodiment of FIG. 5, at step 570 the IC producing entity manufactures or has manufactured the integrated circuit according to the resulting design. The IC producing entity may contract with a chip manufacturer and/or foundry or may operate its own foundry and/or manufacturing facility. Thus, in the context of the present invention, the act of manufacturing an integrated circuit can include contracting for the production of the integrated circuit and receiving the finished product. The contract chip manufacturer and/or foundry may accept photomasks from the IC producing entity or include the production of photomasks in the chip manufacturing process.

Figure 6:
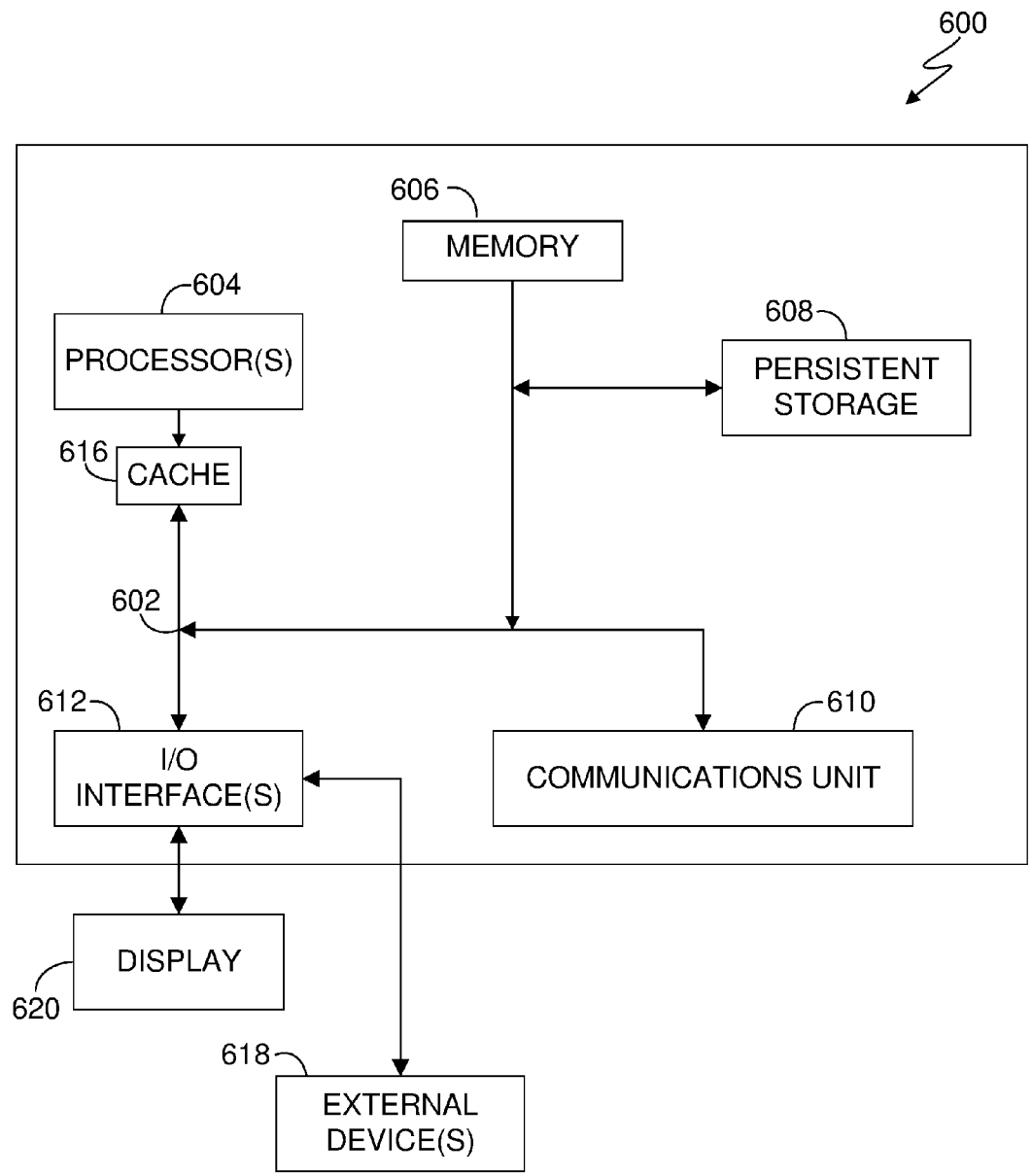
FIG. 6 is a block diagram depicting various logical elements for a computer system capable of executing program instructions, in accordance with at least one embodiment of the present invention.

FIG. 6 is a block diagram depicting components of a computer 600 suitable for executing the latch filler cell generation program 201 and/or the ECO latch insertion program 203. FIG. 6 displays the computer 600, the one or more processor(s) 604 (including one or more computer processors), the communications fabric 602, the memory 606, the RAM, the cache 616, the persistent storage 608, the communications unit 610, the I/O interfaces 612, the display 620, and the external devices 618. It should be appreciated that FIG. 6 provides only an illustration of one embodiment and does not imply any limitations with regard to the environments in which different embodiments may be implemented. Many modifications to the depicted environment may be made.

As depicted, the computer 600 operates over a communications fabric 602, which provides communications between the cache 616, the computer processor(s) 604, the memory 606, the persistent storage 608, the communications unit 610, and the input/output (I/O) interface(s) 612. The communications fabric 602 may be implemented with any architecture suitable for passing data and/or control information between the processors 604 (e.g., microprocessors, communications processors, and network processors, etc.), the memory 606, the external devices 618, and any other hardware components within a system. For example, the communications fabric 602 may be implemented with one or more buses or a crossbar switch.

The memory 606 and persistent storage 608 are computer readable storage media. In the depicted embodiment, the memory 606 includes a random access memory (RAM). In general, the memory 606 may include any suitable volatile or non-volatile implementations of one or more computer readable storage media. The cache 616 is a fast memory that enhances the performance of computer processor(s) 604 by holding recently accessed data, and data near accessed data, from memory 606.

Program instructions for the latch filler cell generation program 201 and/or the ECO latch insertion program 203 may be stored in the persistent storage 608 or in memory 606, or more generally, any computer readable storage media, for execution by one or more of the respective computer processors 604 via the cache 616. The persistent storage 608 may include a magnetic hard disk drive. Alternatively, or in addition to a magnetic hard disk drive, the persistent storage 608 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of the persistent storage 608.

The communications unit 610, in these examples, provides for communications with other data processing systems or devices. In these examples, the communications unit 610 may include one or more network interface cards. The communications unit 610 may provide communications through the use of either or both physical and wireless communications links. The latch filler cell generation program 201 and/or the ECO latch insertion program 203 may be downloaded to the persistent storage 608 through the communications unit 610. In the context of some embodiments of the present invention, the source of the various input data may be physically remote to the computer 600 such that the input data may be received and the output similarly transmitted via the communications unit 610.

The I/O interface(s) 612 allows for input and output of data with other devices that may operate in conjunction with the computer 600. For example, the I/O interface 612 may provide a connection to the external devices 618, which may include a keyboard, keypad, a touch screen, and/or some other suitable input devices. External devices 618 may also include portable computer readable storage media, for example, thumb drives, portable optical or magnetic disks, and memory cards. Software and data used to practice embodiments of the present invention may be stored on such portable computer readable storage media and may be loaded onto the persistent storage 608 via the I/O interface(s) 612. The I/O interface(s) 612 may similarly connect to a display 620. The display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method, comprising:
    receiving a register-transfer-level description and a gate-level description for an integrated circuit design, wherein said gate-level description comprises one or more spare latches implemented as reconfigurable latch filler cells;
    receiving an engineering change order for said integrated circuit design, wherein said engineering change order requires at least one additional latch;
    responsive to said engineering change order, adding said at least one additional latch to said register-transfer-level description;
    for at least one of said at least one additional latch, selecting one of said one or more spare latches in said register-transfer-level description to yield a selected spare latch;
    for said selected spare latch, identifying a selected reconfigurable latch filler cell in said gate-level description;
    replacing said selected reconfigurable latch filler cell with an operational latch in said gate-level description; and
    finalizing said integrated circuit design;
    wherein at least one said reconfigurable latch filler comprises a scan input connection connected to a scan output connection by a short;
    wherein replacing said selected reconfigurable latch filler cell with an operational latch in said gate-level description comprises removing said short;
    wherein said reconfigurable latch filler cell comprises at least one disconnection from a power rail;
    wherein replacing said selected reconfigurable latch filler cell with an operational latch in said gate-level description comprises connecting said reconfigurable latch filler cell to said power rail;

wherein said reconfigurable latch filler cell comprises at least one disconnection from a clock pin;

wherein replacing said selected reconfigurable latch filler cell with an operational latch in said gate-level description comprises connecting said reconfigurable latch filler cell to said clock pin;

wherein said computer-implemented method further comprises generating a netlist from said gate-level description, routing said engineering change order based on said netlist, and omitting re-ordering a scan chain for said integrated circuit design;

wherein said computer-implemented method further comprises identifying one or more clock buffers for said integrated circuit design, said one or more clock buffers having been sized for said one or more spare latches, and reducing said one or more clock buffers to an optimized clock buffer size, based on a number of instantiated latches in said integrated circuit design; and wherein said operational latch is identical in area footprint to an pin-compatible with an originally designed latch.

\* \* \* \* \*